(12) United States Patent
Schutt et al.

(10) Patent No.: US 9,426,458 B2
(45) Date of Patent: *Aug. 23, 2016

(54) VIDEO OUTPUT SUPERVISOR

(71) Applicant: TEXAS INSTRUMENTS INCORPORATED, Dallas, TX (US)

(72) Inventors: Nicholas H. Schutt, Villeneuve-Loubet (FR); Karl F. Greb, Sugar Land, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 37 days.

This patent is subject to a terminal disclaimer.

(21) Appl. No.: 14/513,896

(22) Filed: Oct. 14, 2014

(65) Prior Publication Data

US 2015/0029344 A1 Jan. 29, 2015

Related U.S. Application Data

(63) Continuation of application No. 12/870,641, filed on Aug. 27, 2010, now Pat. No. 8,890,958.

(51) Int. Cl.
| | |
|---|---|
| *H04N 17/04* | (2006.01) |
| *H04N 5/04* | (2006.01) |
| *H04N 21/414* | (2011.01) |
| *H04N 21/4425* | (2011.01) |
| *H04N 21/488* | (2011.01) |
| *G09G 5/14* | (2006.01) |

(52) U.S. Cl.
CPC .............. *H04N 17/045* (2013.01); *G09G 5/14* (2013.01); *H04N 5/04* (2013.01); *H04N 21/41407* (2013.01); *H04N 21/4425* (2013.01); *H04N 21/4882* (2013.01); *G09G 2340/12* (2013.01)

(58) Field of Classification Search
CPC ....................................................... H04N 17/045
USPC ......................................................... 348/184
See application file for complete search history.

(56) References Cited

U.S. PATENT DOCUMENTS

| | | | |
|---|---|---|---|
| 6,677,858 B1 | 1/2004 | Faris et al. | |
| 2004/0239764 A1 | 12/2004 | Overton et al. | |
| 2008/0138030 A1* | 6/2008 | Bryan | H04N 5/4403 386/343 |
| 2009/0063675 A1* | 3/2009 | Faris | G06Q 30/06 709/224 |
| 2009/0100492 A1* | 4/2009 | Hicks, III | H04L 12/2825 725/127 |

* cited by examiner

*Primary Examiner* — Paulos M Natnael
*Assistant Examiner* — Justin Sanders
(74) *Attorney, Agent, or Firm* — Robert D. Marshall, Jr.; Frank D. Cimino

(57) ABSTRACT

A video output supervisor includes a test region indicator for verifying that the commanded output to specific areas of a display is valid. Areas reserved displaying safety-critical data in the data frame to be displayed can be supervised for the presence and status of display indicators of the safety-critical data. The confidence of the supervision can be increased by measuring other display and frame parameters in conjunction with supervising the indicators of the safety-critical data.

20 Claims, 4 Drawing Sheets

VIDEO OUTPUT SUPERVISOR

This application is a continuation of application Ser. No. 12/870,641, filed Aug. 27, 2010, the entirety of which is hereby incorporated by reference.

BACKGROUND

Safety regulations require that certain safety-related items on displays such as automotive dashboards be supervised to help ensure proper display of the safety-related items. Similar requirements exist in other safety-related applications such as industrial control, medical, or any application which requires a functionally safe visual output of critical data. The displayed safety-related data can be shown using lighted "telltales" that may require, for example, optical sensors to externally monitor the displayed safety data. However, such verification approaches increase the complexity and cost of manufacturing, maintaining, and operating such systems.

SUMMARY

The problems noted above are solved in large part by isolating critical nodes of a video output and monitoring them with a supervisor as disclosed herein. An illustrative embodiment comprises a video output supervisor includes a test region indicator for verifying that the commanded output to specific areas of a display is valid. Areas reserved for displaying safety-critical data in the data frame to be displayed can be supervised for the presence and status of display indicators of the safety-critical data. The confidence of the supervision can be increased by measuring other display and frame parameters in conjunction with supervising the indicators of the safety-critical data.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular system components. As one skilled in the art will appreciate, various names may be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . ." Also, the terms "coupled to" or "couples with" (and the like) are intended to describe either an indirect or direct electrical connection. Thus, if a first device couples to a second device, that connection may be through a direct electrical connection, or through an indirect electrical connection via other devices and connections.

Figure 1:
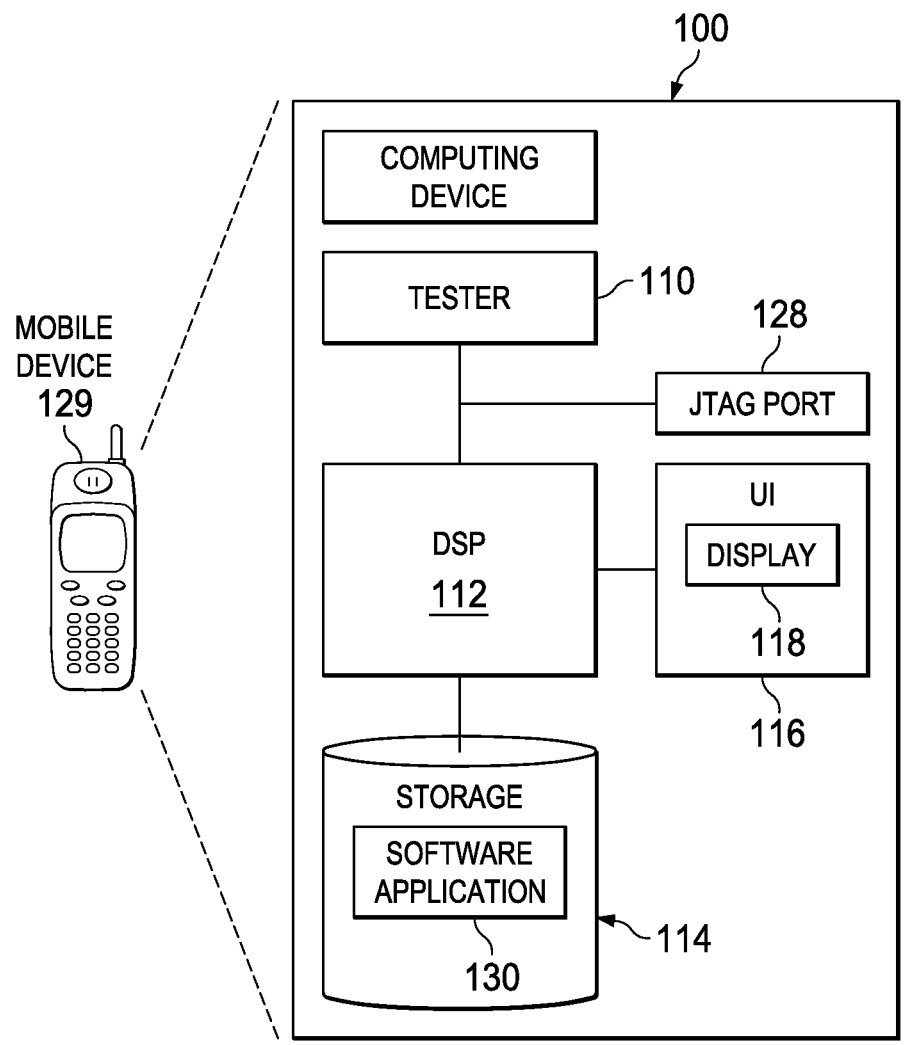
FIG. 1 shows an illustrative computing device 100 in accordance with embodiments of the disclosure.

FIG. 1 shows an illustrative computing device 100 in accordance with embodiments of the disclosure. The computing device 100 may be, or may be incorporated into, a mobile communication device 129, such as a mobile phone, a personal digital assistant (e.g., a BLACKBERRY® device), a personal computer, or any other type of electronic system.

In some embodiments, the computing device 100 comprises a megacell or a system-on-chip (SoC) which includes control logic such as a processor (which, for example, can be a CISC-type CPU, RISC-type CPU, or a digital signal processor (DSP) 112), a storage 114 (e.g., random access memory (RAM)) and tester 110. The storage 114 stores one or more software applications 130 (e.g., embedded applications) that, when executed by the DSP 112, perform any suitable function associated with the computing device 100. The tester 110 comprises logic that supports testing and debugging of the computing device 100 executing the software application 130. For example, the tester 110 may emulate a defective or unavailable component(s) of the computing device 100 so that a software developer may verify how the component(s), were it actually present on the computing device 100, would perform in various situations (e.g., how the component(s) would interact with the software application 130). In this way, the software application 130 may be debugged in an environment which resembles post-production operation.

The DSP 112 typically comprises memory and logic which store information frequently accessed from the storage 114. The computing device 100 is often controlled by a user using a UI (user interface) 116, which typically provides output to and receives input from the user during the execution the software application 130. The output may be provided using the display 118, a speaker, vibrations, and the like. The input may be received using audio inputs (using, for example, voice recognition), and mechanical devices such as keypads, switches, proximity detectors and the like. These and other input and output devices may be coupled to the computing device 100 by external devices using wireless or cabled connections.

Failures of displays (such as display 118) to display commanded information often occur after initial testing and sale of the device to customers and end-users. Disclosed herein are techniques (such as "built-in self-test" techniques) for verifying that the commanded output to specific areas of a display is valid. Typically, areas reserved for displaying safety-critical data in the data frame to be displayed are supervised for the presence and status of display indicators of the safety-critical data. The confidence of the supervision can be increased by measuring other display and frame parameters in conjunction with supervising the indicators of the safety-critical data.

Figure 2:
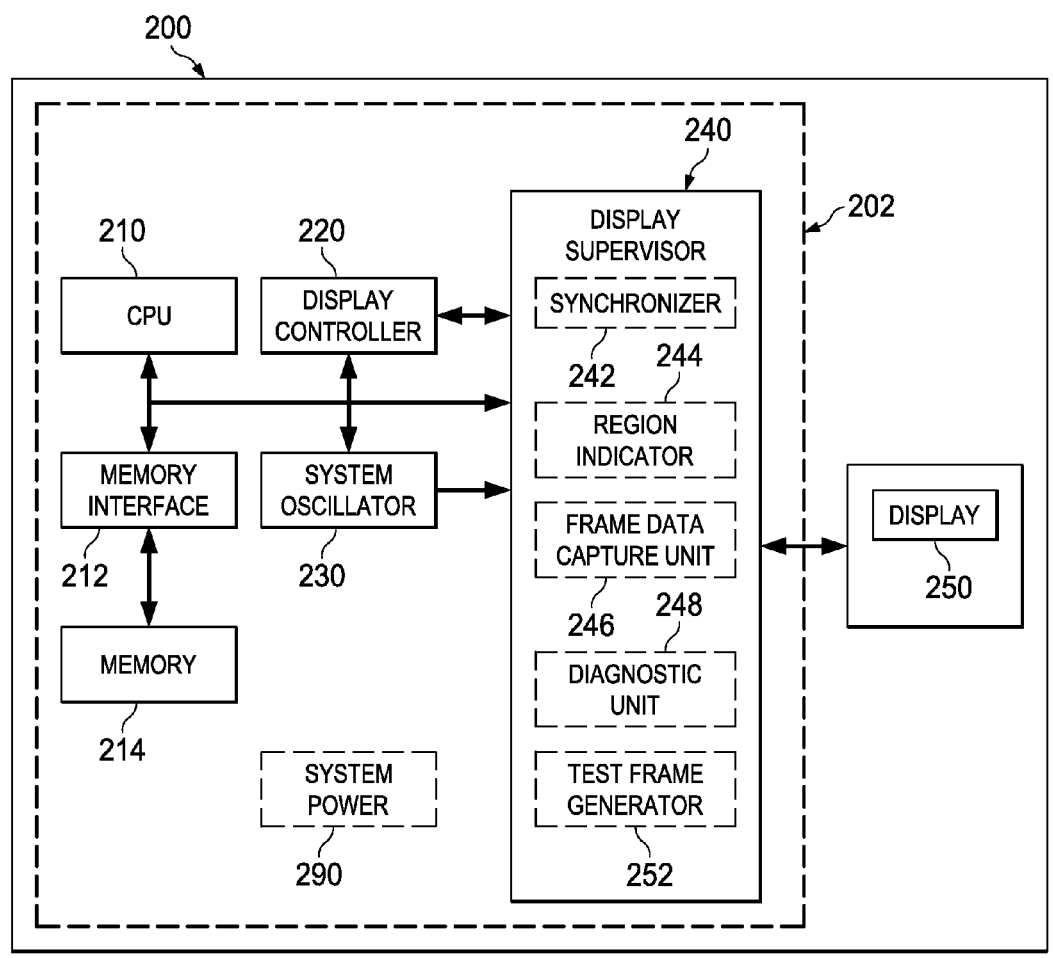
FIG. 2 is a schematic diagram illustrating a supervised display system in accordance with embodiments of the disclosure.

FIG. 2 is a block diagram illustrating a supervised display system in accordance with embodiments of the disclosure. Display system 200 is illustrated including a display control module 202 and display 250. Often the illustrated elements of the display control module 202 are formed using a common substrate although the elements may be implemented in separate circuit boards and packages (including the display 250). System power 290 may be used to power both the display control module 202 and the display 250, although the display 250 may be partially or completely powered by another power supply.

The display control module 202 includes a CPU 210, a display controller 220, a system oscillator 230, a display supervisor, and system power 290 as described above. CPU 210 may be a DSP, controller, microprocessor, and the like, that is used to control the display control module. CPU 210 may be coupled to a memory interface 212 that is arranged to control accesses to memory 214. The memory interface is additionally arranged to permit DMA ("direct memory accesses") of the memory 214 by subsystems such as the display controller 220 and display supervisor 240 without intervention by the CPU 214. The memory 214 is arranged to store information used for display and information used to control and test the display as discussed below.

Figure 4:
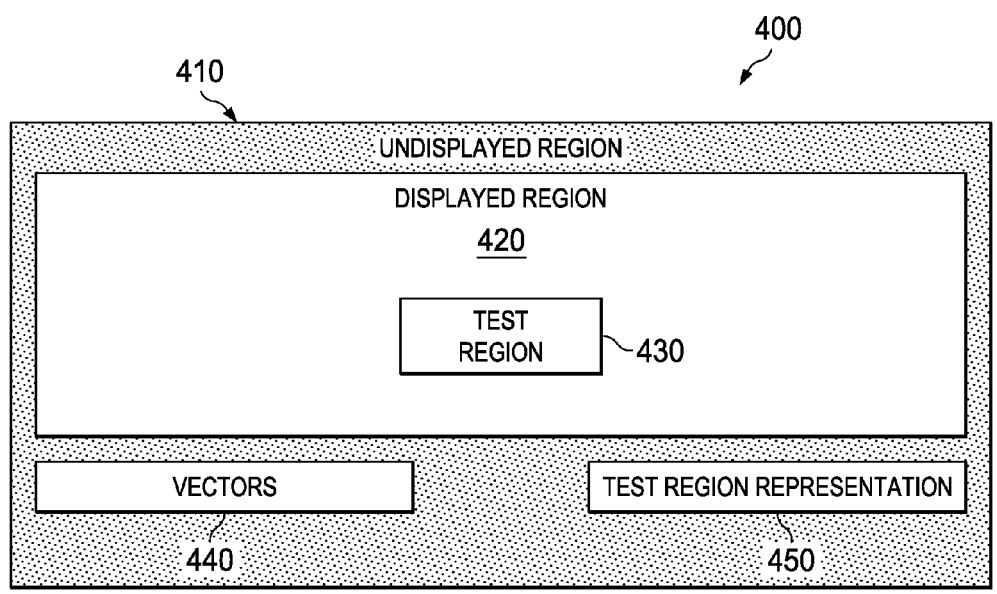
FIG. 4 is a layout diagram illustrating a test frame in accordance with embodiments of the disclosure.

The display controller 220 is arranged to receive commanded information for display and to generate video control signals used to control the display 250 so that the commanded information can be displayed. The display controller 220 may use a clock, for example, from the system oscillator to generate timing signals such as a display controller pixel clock. The display controller pixel clock can be used to generate timing signals such as horizontal, vertical, and frame signals that can be used to display a video frame (such as illustrated in FIG. 4 below). The display controller 220 may be capable of performing DMA accesses of memory and/or receiving commanded information from the CPU 210.

Display supervisor 240 includes a synchronizer 242, a region indicator 244, a frame data capture unit 246, and a diagnostic unit 248. The display supervisor 240 monitors the video control signals generated by the display controller 220. The display supervisor 240 may receive commands from the CPU 210 or be pre-programmed (such as by "flash" memory) to perform specific supervisor tasks as described further herein. The display supervisor 240 may be capable of performing DMA accesses of memory and/or receiving commanded information from the CPU 210. The memory accesses may be to perform and/or communicate the results of diagnostic tests performed on the video control signals with respect to the commanded display information. The display supervisor 240 may also monitor power parameters (such as voltage and/or current) of the display 250 when, for example, specific regions of the commanded information are being displayed.

Figure 3:
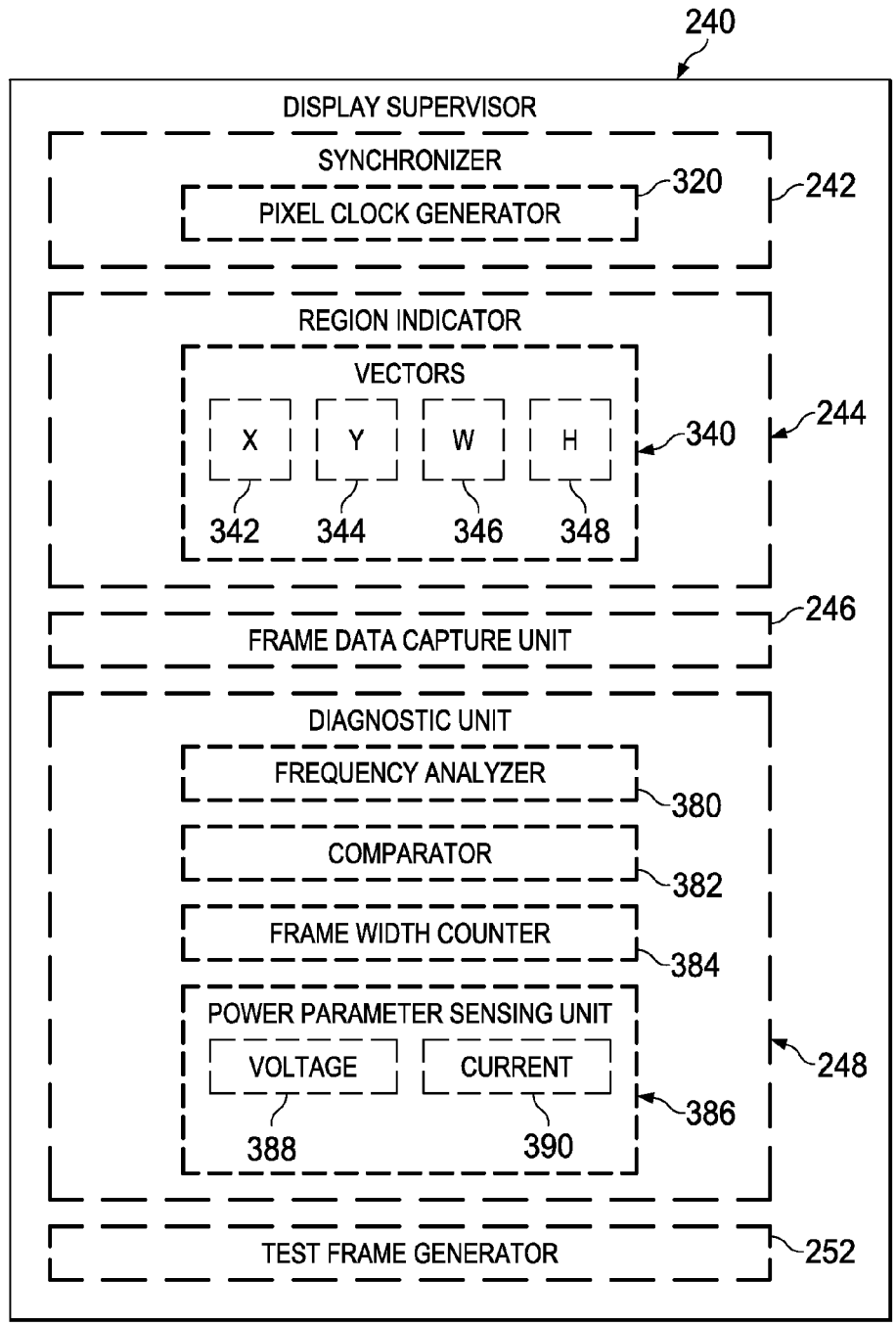
FIG. 3 is a layout diagram illustrating a display supervisor in accordance with embodiments of the disclosure.

FIG. 3 is a block diagram illustrating a display supervisor in accordance with embodiments of the disclosure. The synchronizer 242 of display supervisor 240 monitors the video control signals generated by the display controller 220 and generates synchronization signals that are used by the display supervisor to verify, for example, that commanded information for display is being properly sent to the display 250. For example, pixel clock generator 320 of display supervisor 240 to generate a local pixel clock that can be compared against a "captured" (e.g., monitored) pixel clock included (explicitly or implicitly) in the generated video control signals.

The region indicator 244 of the display supervisor 240 is used to, for example, indicate when the display 250 is displaying pixels within a test region of a frame that is being transmitted for display by the video control signals. The region indicator 244 may use the synchronization signals produced by the synchronizer 242 to determine which pixels are currently being transmitted. The region indicator 244 may include vectors 340 (e.g., preprogrammed or currently received) that describe the area in a displayed frame over which the test region is located. The vectors 340, for example, can describe a region such as a window (see e.g., test region 430 in FIG. 4) defined by a horizontal starting position (vector "X" 342), a vertical starting position (vector "Y" 344), a width (vector "W" 346), and a height (vector "H" 348). The vectors can be algebraically manipulated to define opposing corners of the test region of the frame.

Thus, the region indicator 244 can use the received synchronization signals, for example, to count pulses of a pixel clock to determine when pixels in the test region are being transmitted. For example, pulses of a pixel clock that occur after a vertical synchronization (e.g., a horizontal retrace signal) pulse can be counted to determine which pixel in a line is being displayed. Likewise, horizontal synchronization pulses that occur after a frame synchronization (e.g., a vertical retrace signal) pulse can be counted to determine which line is currently being displayed. A comparator can be used to determine if the current pixel number line number falls within the region defined by the vectors 340. The region indicator 244 may generate a signal indicating the times during which the video control signals are transmitting a portion of the frame data of a test region of a commanded video frame.

The frame data capture unit 246 of the display supervisor 240 is used to, for example, capture data used to display pixels that are located within the test region of a commanded video frame. The frame data capture unit 246 captures a portion of the frame data of a test region of a commanded video frame in response to the indications of the region indicator 244 that the video control signals are transmitting, for example, pixels that are located within the test region of the commanded video frame.

The diagnostic unit 248 of the display supervisor 240 is used to determine whether information that is commanded to be displayed within a test region is being properly transmitted. For example, the diagnostic unit 248 may includes a frequency analyzer 380 that is used to determine the frequency of the pixel clock generated by pixel clock generator 320. The diagnostic unit 248 may use comparator 382 to determine whether the determined frequency of the generated pixel clock is valid with respect to a commanded pixel clock frequency (e.g., the pixel clock frequency of the video control signals being supervised).

The diagnostic unit 248 may also include a frame width counter 384. The frame width counter 384 that is arranged to generate a captured frame width value by counting pulses of the generated pixel clock that occur between successive vertical synchronization signals of the one or more video signals from which timing information is received and to compare the captured frame width value with a commanded frame width value.

The diagnostic unit 248 may use comparator 382 to compare a representation of the captured portion of the frame data of the test region of the frame with a representation of a commanded portion of the frame data of the test region of the frame. The representation of the captured portion of the frame data of the test region of the frame may be, for example, a digital signature performed on data captured by the frame data capture unit 246. (The digital signature can be, for example, a hash function, or a result of a cyclical redundancy check performed on the captured data.) The representation of the portion of the frame data of the test region of the frame may also be, for example, the data itself that was included in the captured portion of the frame data of the test region of the frame.

As an alternative to or in conjunction with using the diagnostic unit 248 to compare the representations, display supervisor 240 may transmit the captured portion of the frame data of the test region of the frame to a memory (such as memory 214). The memory can be the same memory (e.g., bank) used by the display controller for generating the frame data to display the commanded frame for convenience in memory accesses. CPU 210, for example, may be used to compare the representations of the captured data with the commanded data portions of the test regions.

FIG. 4 is a block diagram illustrating a test frame in accordance with embodiments of the disclosure. Test frame 400 includes an undisplayed region 410 and a displayed region 420. The undisplayed region 410 contains information that is typically not displayed, such as in an area of a display that is covered by a bezel or transmitted at a time during which a blanking interval is activated. The displayed region 420 includes a test region 430, which may be (for example) a safety-critical display having verification requirements.

The undisplayed region 410 can include information used to verify, for example, display of the test region 430. Vectors 440 and test region representation 450 can be included in the information of the undisplayed region 410. When received by an intelligent display (having the ability to process received data, as well as displaying it), the intelligent display can read the data from the display memory for the test region and generate a representation of a test portion of the frame data of the test region of the frame. The intelligent display can compare the generated representation of a test portion of the frame data of the test region of the frame with a representation of the test portion of frame data captured from the transmitted test frame 400. The result of the comparison can be signaled, for example, by causing perturbations in the power demanded by the supply. In one embodiment, such power signaling can be accomplished by alternating all pixels on and all pixels off with respect to timing associated with the transmitting of the test region 430 data. In another embodiment, a backlight of the display can be cycled on and off to created both visual (perceptible by the user) and electrical (perceptible by the supervisor power parameter sensors discussed below).

Referring again to FIG. 3, the diagnostic unit 248 may also include a power parameter sensing unit 386. Power parameter sensing unit 386 may have a voltage 388 sensor coupled to a power supply line that is used, for example, to supply power to the display drivers or backlight of the display used to display the test frame 400. Likewise may have a current 390 sensor coupled to the power supply line that is used, for example, to supply power to the display drivers or backlight of the display used to display the test frame 400. Thus the power parameter sensing unit 386 can measure a current or a voltage or both current and voltage of a power supply of the display at a time when the region indicator indicates the test region 430 is being transmitted.

The diagnostic unit 248 may also include a test frame generator 252 for generating the test frame as described with reference to FIG. 4. The test frame generator 252 may generate a test frame 400 (including the vectors 430 and representation 440) in response to, for example, when the region indicator receives a new set of vectors 340, such as when new data is commanded to be displayed, upon cycling of power, and other such events.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A supervisor circuit for verifying portions of information to be displayed, comprising:

a synchronizer that is arranged to receive timing information from one or more video signals that include frame data generated by a display controller for driving a display and to generate synchronization signals in response to the received timing information;

a region indicator that is arranged to, in response to the generated synchronization signals, indicate when the one or more video signals is transmitting a portion of the frame data of a test region of a frame;

a frame data capture unit that is arranged to, in response to one or more indications from the region indicator, capture the portion of the frame data of the test region of the frame; and a diagnostic unit that is arranged to compare a representation of the captured portion of the frame data of the test region of the frame with a representation of a commanded portion of the frame data of the test region of the frame.

2. The circuit of claim 1, wherein synchronizer includes: a pixel clock generator to generate a pixel clock from the received timing information.

3. The circuit of claim 2, wherein the diagnostic unit includes a frequency analyzer to determine the frequency of the generated pixel clock and a comparator to determine whether the determined frequency of the generated pixel clock is valid with respect to a commanded pixel clock frequency.

4. The circuit of claim 2, wherein the diagnostic unit includes a frame width counter that is arranged to generate a captured frame width value by counting pulses of the generated pixel clock that occur between successive vertical synchronization signals of the one or more video signals from which timing information is received and to compare the captured frame width value with a commanded frame width value.

5. The circuit of claim 1, wherein the region indicator includes vectors for defining the area over which the one or more video signals is transmitting the portion of the frame data of the test region of a frame.

6. The circuit of claim 5, wherein the vectors are arranged to define opposing corners of the test region of the frame.

7. The circuit of claim 1, wherein the representation of the captured portion of the frame data of the test region of the frame is a digital signature of the captured portion of the frame data of the test region of the frame.

8. The circuit of claim 1, wherein the representation of the captured portion of the frame data of the test region of the frame is a cyclical redundancy check result of the captured portion of the frame data of the test region of the frame.

9. The circuit of claim 1, wherein the representation of the captured portion of the frame data of the test region of the frame is the data itself of the captured portion of the frame data of the test region of the frame.

10. The circuit of claim 1, wherein the frame data capture unit is arranged to transfer the captured portion of the frame data of the test region of the frame to a memory that is used by the display controller for generating the frame data.

11. The circuit of claim 1, further comprising a test frame generator that is arranged to generate a test frame for transmitting to the display, wherein the test frame includes data for a displayed region and includes data for an undisplayed region, wherein the data for an undisplayed region includes vectors for defining the area over which the one or more video signals is transmitting a test region that corresponds to a test portion of the data for a displayed region, and includes a representation of a test portion of the frame data of the test region of the frame for comparing with a representation of the test portion of frame data captured from the transmitted test frame.

12. The circuit of claim 1, wherein the diagnostic unit comprises a power parameter sensing unit that is arranged to measure a current or a voltage or both current and voltage of a power supply of the display in response to the one or more indications from the region indicator.

13. A display system, comprising:
a display that is arranged to display frame data;
a processor that is arranged to generate the frame data;
a video control unit that is arranged to receive timing information from one or more video signals that include frame data generated by a display controller for driving a display, to generate synchronization signals in response to the received timing information, wherein the synchronization signals at least indicate when the one or more video signals is transmitting a portion of a test region of the frame data, to capture the indicated portion of the frame data of the test region of the frame, and to compare a representation of the captured portion of the frame data of the test region of the frame with a representation of a commanded portion of the frame data of the test region of the frame.

14. The system of claim 13 wherein the processor is arranged to generate a test frame and to transmit the generated test frame to the display, wherein the test frame includes data for a displayed region and an undisplayed region, wherein the data for an undisplayed region includes vectors for defining the area over which the one or more video signals transmit a test region that corresponds to a test portion of the data for a displayed region, and includes a representation of a test portion of the frame data of the test region of the generated test frame.

15. The system of claim 14 wherein the display is configured to generate a representation of the test portion of the transmitted test frame and to compare the display-generated representation with the transmitted representation of a test portion of the frame data of the test region of the generated test frame.

16. A method for supervising data for display, comprising:
receiving timing information from one or more video signals that include frame data generated by a display controller for driving a display;
generating synchronization signals in response to the received timing information, wherein the synchronization signals at least indicate when the one or more video signals is transmitting a portion of a test region of the frame data;
capturing a portion of the frame data of the test region of the frame using the generated synchronization signals; and
comparing a representation of the captured portion of the frame data of the test region of the frame with a representation of a commanded portion of the frame data of the test region of the frame.

17. The method of claim 16, wherein the synchronization signals are generated using vectors for defining the area over which the one or more video signals is transmitting the portion of the frame data of the test region of a frame.

18. The method of claim 16, wherein the representation of the captured portion of the frame data of the test region of the frame is a digital signature of the captured portion of the frame data of the test region of the frame.

19. The method of claim 16, further comprising generating a test frame and transmitting the generated test frame to the display, wherein the test frame includes data for a displayed region and an undisplayed region, wherein the data for an undisplayed region includes vectors for defining the area over which the one or more video signals transmit a test region that corresponds to a test portion of the data for a displayed region, and includes a representation of a test portion of the frame data of the test region of the generated test frame.

20. The method of claim 16, further comprising measuring a power parameter of the display in response to the synchronization signals indicating when the one or more video signals is transmitting a portion of a test region of the frame data.

* * * * *